United States Patent [19]
Jeong et al.

[11] Patent Number: 5,483,399
[45] Date of Patent: Jan. 9, 1996

[54] SELF-LATCHING RESTRAINT FOR AN ACTUATOR OF A DISK DRIVE

[75] Inventors: Woo-Cheol Jeong; Yeong-Mok Kim; Hee-Cheol Bum, all of Seoul; Jong Jeon, Suwon, all of Rep. of Korea

[73] Assignee: Samsung Electronics Co., Ltd., Suwon, Rep. of Korea

[21] Appl. No.: 249,274

[22] Filed: May 25, 1994

[30] Foreign Application Priority Data

May 27, 1993 [KR] Rep. of Korea ............... 1993-9320

[51] Int. Cl.$^6$ .............................................. G11B 5/54
[52] U.S. Cl. .................................................. 360/105
[58] Field of Search .................................... 360/105

[56] References Cited

U.S. PATENT DOCUMENTS

| | | |
|---|---|---|
| 4,706,142 | 11/1987 | Harrori . |
| 4,796,130 | 1/1989 | Shimanuki . |
| 4,996,617 | 2/1991 | Yaeger . |
| 5,019,932 | 5/1991 | Iwata . |
| 5,208,713 | 5/1993 | Lindsay . |
| 5,241,438 | 8/1993 | Matsushima . |
| 5,274,519 | 12/1993 | Saito . |
| 5,278,819 | 1/1994 | Shimegi . |
| 5,296,986 | 3/1994 | Morehouse . |

*Primary Examiner*—A. J. Heinz
*Attorney, Agent, or Firm*—Bushnell, Robert E.

[57] ABSTRACT

An actuator fixing apparatus for a disk drive of a computer is disclosed. In a disk drive system having a disk capable of being rotated at a high speed by a spindle motor, a pivotally installed actuator, head gimbals installed on one end of the actuator connecting the actuator to a magnetic head, a voice coil motor and a bobbin positioned on a bottom portion of the actuator, an actuator fixing apparatus includes an automatic locking arm extending from an end portion of the actuator. The automatic locking arm has a locking groove formed on a bottom portion thereof. The apparatus also includes a stopper having first and second locking magnets and a hook-shaped locking unit rotatably installed adjacent to the stopper having first and second metal conducting plates. The hook-shaped locking unit has a locking projection extending from it, whereby the locking projection is inserted into the locking groove to prevent movement of the actuator. When the locking projection is fully inserted into the locking groove, the second locking magnet and the second metal conductor are attached. Similarly, when the locking projection is fully withdrawn from the locking groove, the first locking magnet and the first metal conductor are attached.

20 Claims, 3 Drawing Sheets

SELF-LATCHING RESTRAINT FOR AN ACTUATOR OF A DISK DRIVE

CROSS-REFERENCE TO RELATED APPLICATIONS

This application makes reference to, incorporates the same herein, and claims all benefits accruing under 35 U.S.C. §119 arising from an application for Actuator Latching Apparatus Of A Hard Disk Drive earlier filed in the Korean Industrial Property Office on 27 May 1993 and then duly assigned Serial No. 9320/1993.

BACKGROUND OF THE INVENTION

The present invention relates to a hard disk drive used as an external memory device for a computer, and more particularly, to an assembly for maintaining an actuator of a hard disk drive in a parking zone while the actuator is not in operation.

Typically, and as is illustrated in Bistable Magnetic/Electromagnetic Latch For A Disk File Actuator by J. Lindsay, et al., U.S. Pat. No. 5,208,713 and in Rotary Internal Latch For Disk Drive Actuator To Protect Against Rotational Shock Force, by J. H. Morehouse, et at., U.S. Pat. No. 5,296,986, a disk drive in a computer includes a disk which is rotated at a high speed by a spindle motor, and an actuator for initiating movement of a magnetic head that reads and writes data recorded on tracks of the disk. The actuator has a cantilevered arm that is mounted upon a pivot positioned at a first end, enabling access of the magnetic head to substantially the entire base surface of the disk. A bobbin and a coil, installed at the first end of the actuator, move the arm of the actuator through operation of a voice coil motor. Head gimbals, connected to a second, or distal end of the arm of the actuator, act as a conduit between the actuator and the magnetic head. The magnetic head, installed on a front portion of the head gimbals, positions itself along the surface of the disk, thereby writing and reading data to and from the disk tracks as the disk rotates. When the disk drive is started, the disk rotates and the airflow accompanying this rotation causes the magnetic head to float up from the surface of the disk, and drives it to access the disk for recording or read-out of data, and when the disk drive is halted the magnetic head comes to rest at a parking zone.

Upon de-energization of the disk drive, the actuator is placed in a locked state and the magnetic head is accordingly positioned in a parking zone located on an inner portion of the disk, thereby preventing recorded data from being damaged due to undesired contact of the magnetic head against the surface of the disk, a contact that might deleteriously permanently impair the ability of the disk to receive and maintain storage of data as bits of magnetic data.

In the design of disk drives, it is therefore imperative that an actuator device, such as the aforementioned examples, provide a reliable locking mechanism by which the device itself, and the magnetic head that it controls, will be positionally secured in order to prevent undesired movements which could disrupt or destroy the recorded data. Accordingly, many types of locking mechanisms for actuator arms have emerged.

One type of actuator locking mechanism utilizes permanent magnets. While magnet-type locking mechanisms are generally desirable, having many advantages over manual locks which require the intervention of an informed user, they are also known to have certain disadvantages associated with them. For example, most magnet-type locking mechanisms require that a portion of the actuator be placed in direct contact with a locking magnet. I have observed that this type of mechanism unfortunately has the adverse affect of converting kinetic energy produced from the activator into undesired, extraneous noise signals.

Even if a locking mechanism is designed to avoid occurrence of direct contact between the actuator and the locking magnet, adverse effects can still result from the mere presence of a magnetic field in proximity with the actuator. Specifically, when the magnectic head is positioned around the track on which the innermost data is recorded, the magnetic field can result in undesired forces being applied to the actuator, thereby adversely affecting the servo-control functions of the drive, lengthening the read time, and increasing the probability of data errors.

SUMMARY OF THE INVENTION

It is therefore an object of the present invention to provide an improved actuator for a disk drive memory.

It is also an object of the present invention to provide a restraint capable of preventing movement of a magnetic head borne by an actuator of a disk drive memory from the parking zone to a data zone where data is recorded.

It is another object to provide an actuator restraint capable of preventing movement of the magnetic head from the parking zone even in the presence of internal oscillations produced by shock or impact from the exterior of the equipment.

It is still another object to provide an actuator restraint that has no effect on subcontrol functions of the disk drive when the actuator operates to enable reading and writing of data from the disk.

It is yet another object to provide an actuator restraint that effectively shields stray magnetic fields from the surface of the disk.

These and other objects may be achieved in accordance with the principles of the present invention with a self-latching actuator restraint assembly having an automatic locking arm extending from an end portion of the actuator. The automatic locking arm has a locking groove formed on a bottom portion and damping material extending from an end portion. The apparatus also includes a stopper with first and second locking magnets and a rotatable hook-shaped locking unit having first and second metal latch plates, made preferable of magnetic steel, installed adjacent to the stopper. The hook-shaped locking unit also has a locking projection inwardly to accept insertion into the locking groove to prevent movement of the actuator and magnetic head. In the locked position, the second locking magnet engages the second metal plate to prevent further rotation of the locking unit and thereby maintain the locked position. To remove the actuator from the locked position, the engagement between the second locking magnet and the second metal plate is severed while the locking unit rotates while withdrawing the locking projection from the locking groove of the automatic locking arm. As rotation of the locking unit continues, the first locking magnet of the stopper engages the first metal plate of the locking unit to prevent further rotation of the locking unit while maintaining the actuator in the unlocked position.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In the following description, specific details are set forth to provide a more thorough understanding of the present invention.

Figure 1:
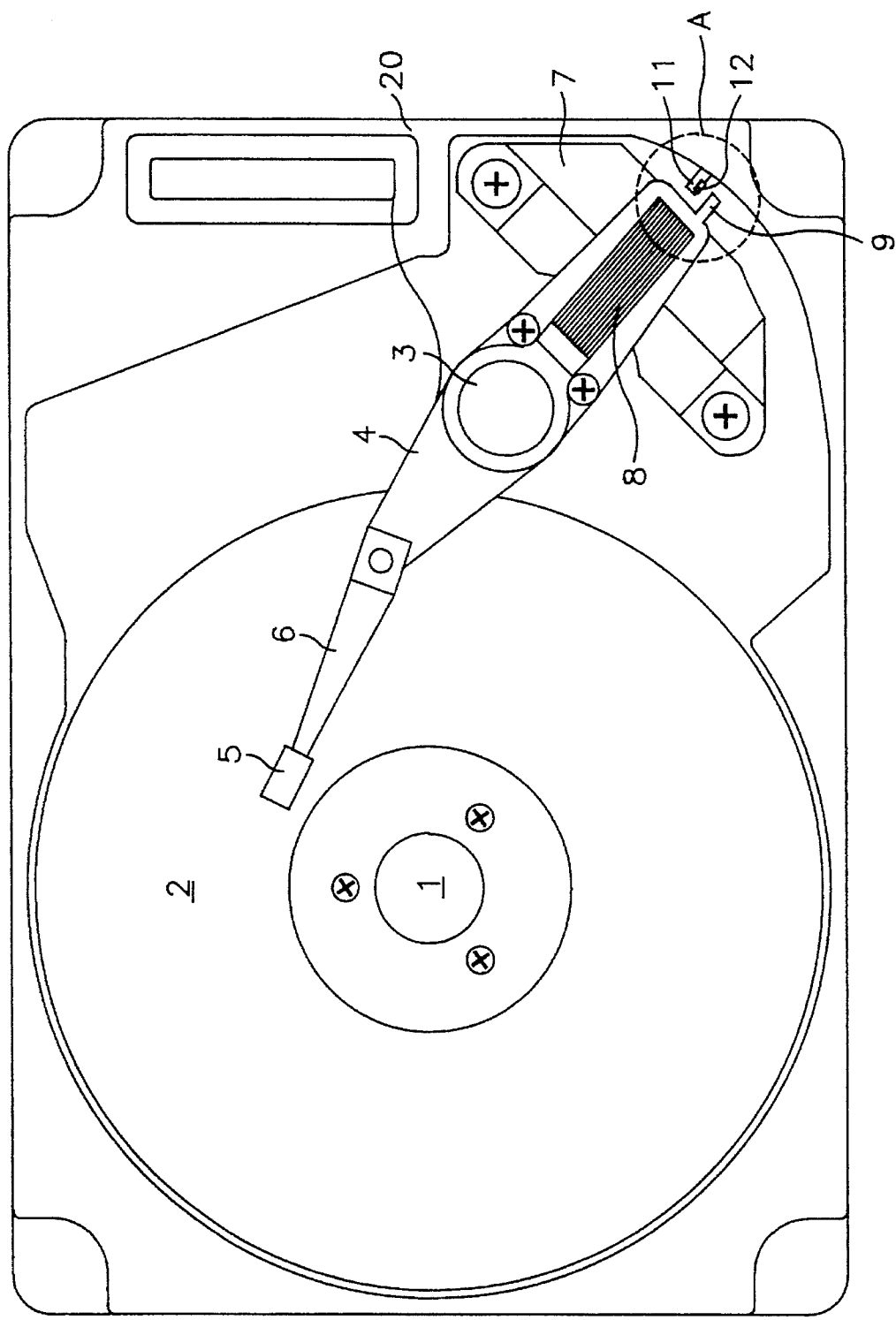
FIG. 1 illustrates a disk drive having a conventional actuator.
Figure 2:
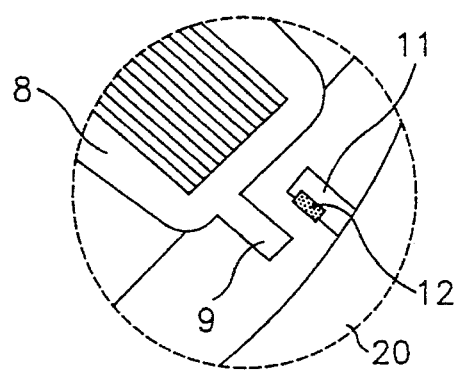
FIG. 2 provides an enlarged view of section "II" indicated by a dotted circle shown in FIG. 1.

Turning now to the drawings, FIG. 1 illustrates a hard disk drive having a conventional actuator assembly. A memory disk 2 bearing a base surface providing magnetic storage of binary data rotates at a high speed by a spindle motor 1. Head gimbals 6, having a magnetic head 5 for writing and reading data to and from the disk, are attached to an actuator 4. An automatic locking arm 9 constructed from a conductive metallic material is installed on a first end portion of the actuator 4, while a middle portion of the actuator 4 is pivotally installed on a body portion 20 via a fixed pivot 3. An automatic locking magnet 12, having bipolar characteristics, is mounted on an upright post, or stopper 11 that is fixed to the body portion 20 of the housing of the disk drive. When automatic locking arm 9 of the actuator 4 approaches magnet 12 within a specified range, magnet 12 pulls the automatic locking arm 9 into contact with magnet 12, thus locking actuator 4 in a fixed position.

When data is read from or written onto the base surface of disk 12, automatic locking arm 9 of actuator 4 is released from automatic locking magnet 12, thereby enabling access of magnet head 5 to the base surface of disk 2. When the disk drive is not in operation or when a park instruction is performed, the automatic locking arm 9 of the actuator 4 attaches to the automatic locking magnet 12, thus restraining actuator 4. Actuator 4 is directed into the locked position by movement of bobbin 8. Bobbin 8 is moved by an electromagnetic force induced from the residual current of the voice coil motor 7 or the retract current of the spindle motor 1.

As discussed earlier in this specification, the conventional apparatus described above has many disadvantages. First, since automatic locking arm 9 directly contacts automatic locking magnet 12 in order to lock, kinetic energy from the actuator is often converted into noise, thereby adversely affecting data transfer to and from disk 2. Furthermore, during operation of actuator 4, if magnetic head 5 approaches those tracks on the innermost portion of disk 2 (i.e. towards the center of the disk), a magnetic field between automatic locking magnet 12 and automatic locking arm 9 creates an attraction between the two elements which tends to pull the arm 9 towards magnet 12. This attraction can have an adverse effect on the servo-control functions of the disk drive, thus increasing the time required for a read cycle. Moreover, the magnetic field between the two elements can deleteriously restrict operability of magnetic head 5, thus increasing the chance of introduction of an error during reading or writing of data.

Figure 4:
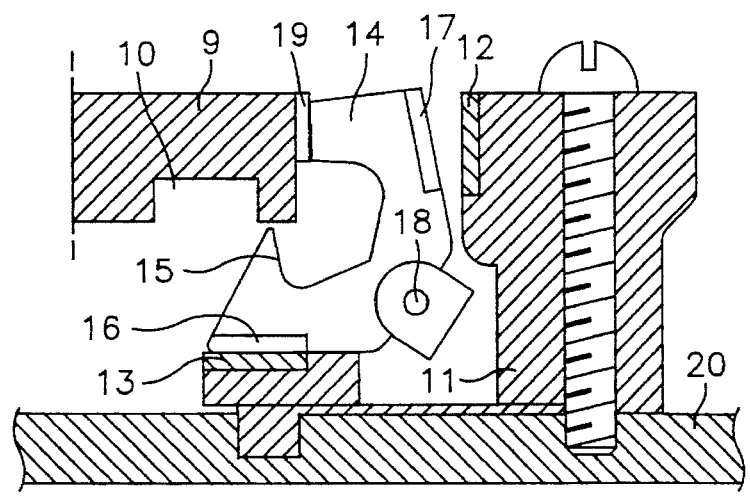
FIG. 4 illustrates the actuator restraint of FIG. 3 in an unlocked state.
Figure 5:
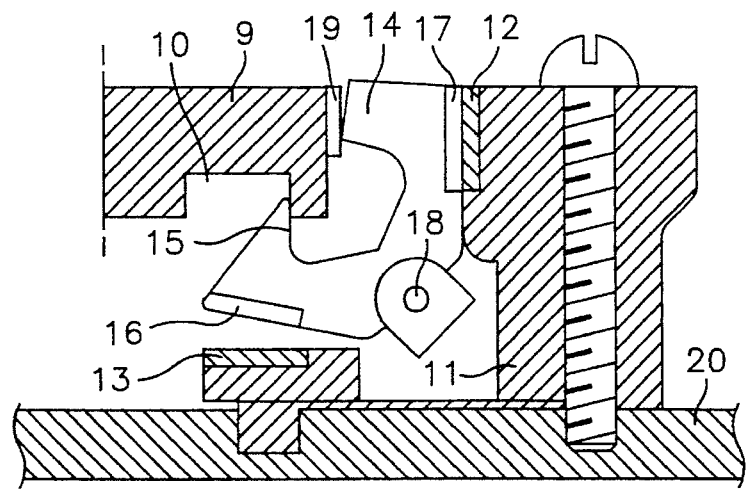
FIG. 5 illustrates the actuator restraint of FIG. 3 in a locked state.
Figure 3:
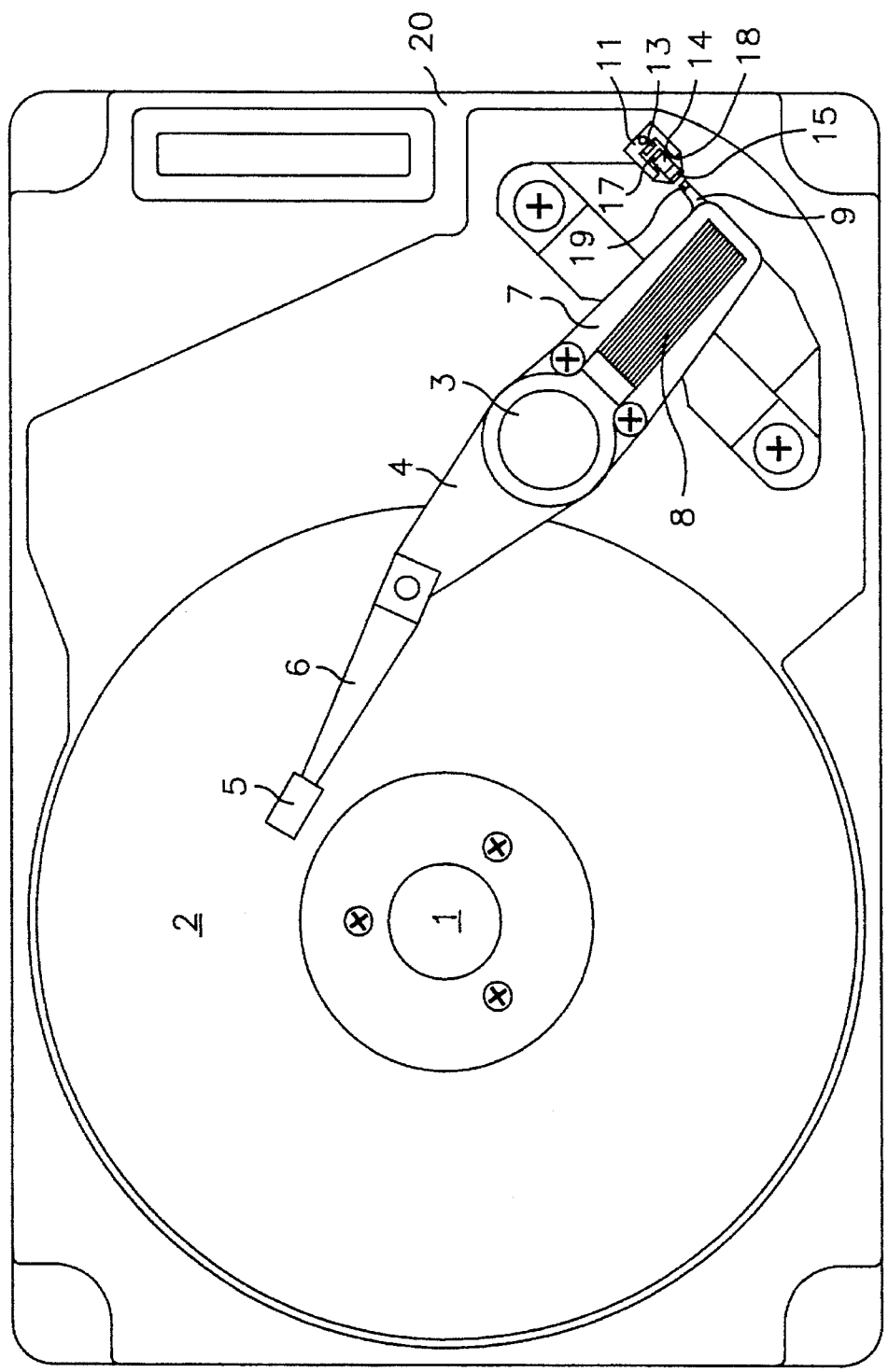
FIG. 3 illustrates a disk drive having an actuator restraint constructed according to the principles of the present invention.

One embodiment of the present invention, endeavors to remedy the foregoing deficiencies associated with the contemporary disk drives. Referring now to FIGS. 3 through 5, FIG. 3 illustrates a memory disk 2 capable of rotating at a high speed by rotational force provided from a spindle motor 1. Head gimbals 6, having a magnetic head 5 installed on a distal end portion, are attached to one end of an actuator 4. The other end of the actuator 4 is pivotally installed on a body portion 20 of a disk drive assembly via pivot 3. A voice coil motor 7 is positioned on a bobbin 8; bobbin 8 is installed on a bottom portion of actuator 4. An automatic locking arm 9 extends from an end portion of bobbin 8.

Referring specifically now to FIGS. 4 and 5, automatic locking arm 9 has a locking groove 10 positioned on the underside of a bottom portion to provide a downwardly protruding lip 24 to enable an inside edge of an upwardly protruding detent 26 forming one terminal end of a hook-shaped locking unit 14 to engage an inside surface 28 of lip 24 of arm 9. A damping material 19 is attached to and extends slightly downwardly from an end portion of the automatic locking arm 9. Damping material 19 may be rubber, a coil spring or a plate spring. A locking projection 15 extends upwardly from hook-shaped locking unit 14 while metal plates 16 and 17 made preferably made of magnetic steel are integrally formed at bottom and top portions of the hook-shaped locking unit 14, respectively. A hinge shaft 18, enabling rotational motion of hook-shaped locking unit 14, is formed at a middle portion of hook-shaped locking unit 14. A bail 30 is provided to support hinge shaft 18. Permanent locking magnets 12 and 13, formed to magnetically engage metal plates 17 and 16, respectively, are attached to top and bottom portions of a stopper 11, respectively. Locking surfaces of permanent locking magnets 12 and 13 are arranged such that they are substantially perpendicular to each other. Bottom portion of stopper 11, having a base 40 and a tab 50 that is insertable into body portion 20, is horizontally displaced from the top portion of stopper 11. Both portions of stopper 11 are positioned adjacent to hook-shaped locking unit 14, but are each spaced sufficiently apart from locking unit 14 to enable locking unit 14 to pivot around its shaft 18 as locking unit 14 rotates under the force of arm 9 between its unlatched position as shown in FIG. 4, to its latched position, as shown in FIG. 5.

When the magnetic head 5 is located in a locked (or parked) position, initiation of disk drive operation begins when an electrically induced force from voice coil motor 7 produces movement of bobbin 8. Upon movement of bobbin 8, head gimbals 6 extending from actuator 4 move magnetic head 5 towards the surface of disk 2, thus enabling the reading and writing of data.

In order to remove magnetic head 5 from the parked position in order to enable the voice coil to move magnetic head 5 to addressed locations on the surface of memory disk 2, automatic locking arm 9 installed at the first end portion of actuator 4 must be released from hook-shaped locking unit 14. To achieve this, an electrically induced force from voice coil motor 7 overcomes the attraction between permanent locking magnet 12 and metal plate 17 thereby producing counterclockwise rotation of hook-shaped locking unit 14 around hinge shaft 18. As hook-shaped locking unit 14 rotates, locking projection 15 is displaced downward and accordingly withdraws from locking groove 10 positioned on the bottom portion of automatic locking arm 9. As locking projection 15 moves downward, metal plate 16 installed at the bottom portion of hook-shaped locking unit 14 magnetically attaches to permanent locking magnet 13. Therefore, automatic locking arm 9 is released from hook-shaped locking unit 14 and automatic locking arm 9 of actuator 4 moves in the direction shown in FIG. 4.

If the operating state of actuator 4 is to be terminated, perhaps due to a power failure, magnetic head 5 is returned to the parked position. A residual current from voice coil motor 7 induces an electromagnetic force that produces movement of bobbin 8, thus moving magnetic head 5 towards the parked position. As automatic locking arm 9 of actuator 4 moves in the direction shown in FIG. 5, damping material 19, which extends from the end portion of automatic locking arm 9, contacts an upper portion of locking unit 14, thereby rotating locking unit 14 clockwise around hinge shaft 18. Hence, metal plate 17 installed on the top portion of locking unit 14 magnetically attaches to permanent locking magnet 12. At the same time, metal plate 16 installed at the bottom portion of locking unit 14 is separated from permanent locking magnet 13. As the locking unit 14 continues to rotate, locking projection 15 inserts into locking groove 10 while gripping inside surface 28 of lip 24 of automatic locking arm 9, thus placing actuator 4 in a restrained position, as shown in FIG. 5. As a result, magnetic head 5 is prevented from moving from the parking zone to the data zone.

In a locked state, even if internal oscillations resulting from shock or impact from the exterior of the equipment occurs, locking projection 15 of locking unit 14 is firmly secured to automatic locking arm 9 of actuator 4, and thus, magnetic head 5 does not escape from the parked position.

As described above, there is provided an automatic locking arm 9 installed at a first end portion of an actuator 4. When actuator 4 is placed in a locked position, damping material 19, which extends from an end portion of automatic locking arm 9, contacts hook-shaped locking unit 14. The use of damping material 19 for contacting locking unit 14, as compared with a non-damping material, helps reduce noise produced from the kinetic energy of actuator 4. Locking unit 14, as a result of its contact with damping material 19, rotates counterclockwise until locking projection 15 is inserted into locking groove 10 located on a bottom portion of automatic locking arm 9. At the same time, metal plate 17 installed on the top portion of locking unit 14 attaches to permanent locking magnet 12, and actuator 4 is thereby placed in a fixed position. Since actuator 4 is fixed by locking unit 14 without producing movement of magnetic head 5, subcontrol functions of the disk drive can be easily implemented and read/write functions can be improved.

While the preferred embodiment of the present invention has been shown and described, it will be understood by those skilled in the art that changes in form and details may be made to the foregoing without departing from the spirit and scope of the present invention.

What is claimed is:

1. A self-latching restraint apparatus for an actuator of a disk drive, said disk drive comprising a disk that is rotated at a high speed by a spindle motor, said actuator turning on a pivot, head gimbals installed between said actuator and a magnetic head, a voice coil motor, and a bobbin positioned on a bottom portion of said actuator, said self-latching restraint apparatus comprising:

an automatic locking arm protruding from a first end portion of said actuator;

damping material extending from an end portion of said automatic locking arm;

a locking groove formed on a bottom portion of said automatic locking arm for providing a region where said automatic locking arm can be gripped;

a stopper fixedly attached to a body portion; and a locking unit rotatably installed adjacent to said stopper, said locking unit comprising a hook-shaped locking projection extending upwardly, said locking unit rotating in response to said damping material engaging a first portion of said locking unit and causing said hook-shaped locking projection to be inserted into said locking groove to thereby grip said automatic locking arm and prevent movement of said actuator.

2. The self-latching restraint apparatus for an actuator of a disk drive as claimed in claim 1, wherein said locking unit further comprises first and second magnetic plates integrally installed at bottom and top portions, respectively, each of said first and second magnetic plates for securing a separate rotational position of said locking unit, said locking unit further comprising a hinge shaft installed at a middle portion for enabling rotational motion of said locking unit.

3. The self-latching restraint apparatus for an actuator of a disk drive as claimed in claim 2, wherein said stopper comprises first and second locking magnets, said first locking magnet magnetically attaching to said first magnetic plate to secure said locking unit in a first rotational position, said second locking magnet magnetically attaching to said second magnetic plate to secure said locking unit in a second rotational position.

4. The self-latching restraint apparatus for an actuator of a disk drive as claimed in claim 3, wherein said first rotational position of said locking unit indicates an unlocked state of said actuator and said second rotational position of said locking unit indicates a locked state of said actuator.

5. The self-latching restraint apparatus for an actuator of a disk drive as claimed in claim 3, wherein said hook-shaped locking projection of said locking unit is inserted into said locking groove of said automatic locking arm when said locking unit is in said second rotational position.

6. The self-latching restraint apparatus for an actuator of a disk drive as claimed in claim 3, wherein said hook-shaped locking projection of said locking unit is removed from said locking groove of said automatic locking arm when said locking unit is in said first rotational position.

7. The self-latching restraint apparatus for an actuator of a disk drive as claimed in claim 2, wherein said damping material is comprised of one of rubber and a plate spring.

8. The self-latching restraint apparatus for an actuator of a disk drive as claimed in claim 1, wherein said damping material is comprised of one of rubber and a plate spring.

9. A self-latching restraint apparatus for an actuator of a disk drive, comprising:

a locking arm extending from a first end portion of said actuator, said locking arm having a locking groove formed on a bottom portion for providing a region wherein said locking arm can be gripped;

damping material installed at an end portion of said locking arm;

a stopper fixedly attached to a body portion, said stopper having first and second locking magnets integrally installed at bottom and top portions, respectively; and a locking unit rotatably installed adjacent to said stopper, said locking unit comprising a locking projection extending upwardly from said locking unit, said locking unit further comprising first and second magnetic plates integrally installed at bottom and top portions, respectively;

said locking unit rotating in a first rotational direction in response to said damping material engaging a first portion of said locking unit, said locking unit continuing to rotate in said first rotational direction until said second magnetic plate of said locking unit engages and magnetically attaches to said second locking magnet of said stopper to prevent movement of said actuator.

10. The self-latching restraint apparatus for an actuator of a disk drive as claimed in claim 9, wherein said locking projection of said locking unit is inserted into said locking groove of said locking arm when said second magnetic plate installed at the top portion of said locking unit is magnetically attached to said second locking magnet installed at the top portion of said stopper.

11. The self-latching restraint apparatus for an actuator of a disk drive as claimed in claim 10, wherein said locking projection of said locking unit is withdrawn from said locking groove of said locking arm when said first magnetic plate installed at the bottom portion of said locking unit is magnetically attached to said first locking magnet installed at the bottom portion of said stopper, thereby allowing movement of said actuator.

12. The self-latching restraint apparatus for an actuator of a disk drive as claimed in claim 10, wherein said damping material comprises one of rubber and a plate spring.

13. The self-latching restraint apparatus for an actuator of a disk drive as claimed in claim 9, wherein said damping material is comprised of one of rubber and a plate spring.

14. In a self-latching restraining apparatus for an actuator of a disk drive comprising a locking arm protruding from a first end portion of said actuator, said locking arm having damping material extending from an end portion, a locking groove formed on a bottom portion of said locking arm, a stopper having first and second locking magnets integrally installed at bottom and top portions, respectively, and a locking unit rotatably installed adjacent to said stopper, said locking unit comprising first and second magnetic plates integrally installed at bottom and top portions, respectively, said locking unit further comprising a locking projection extending upwardly from said locking unit, a method of restraining said actuator, sequentially comprising the steps of:

engaging a first portion of said locking unit with said damping material of said locking arm to produce rotation of said locking unit in a first rotational direction;

disengaging said first locking magnet of said stopper from said first magnetic plate of said locking unit in response to said rotation of said locking unit in said first rotational direction;

inserting said locking projection of said locking unit into said locking groove of said locking arm as said locking unit continues to rotate in said first rotational direction; and engaging said second locking magnet of said stopper with said second magnetic plate of said locking unit to thereby prevent further rotation of said locking unit in said first rotational direction and restrain said actuator.

15. The method of restraining said actuator as claimed in claim 14, wherein said damping material is selected from a group comprised of rubber and a plate spring.

16. A self-latching restraint apparatus for an actuator of a disk drive, comprising:

a locking arm extending from a first end portion of said actuator, said locking arm having a locking groove formed on a bottom portion for providing a region wherein said locking arm;

damping material extending from an end portion of said locking arm;

a stopper fixedly attached to a body portion, said stopper having first and second locking magnets integrally installed at bottom and top portions, respectively; and a hook-shaped locking unit rotatably installed upon a hinge shaft adjacent to said stopper, said hook-shaped locking unit having a locking projection extending upwardly from said hook-shaped locking unit, said hook-shaped locking unit further comprising first and second magnetic plates integrally installed at bottom and top portions, respectively;

said hook-shaped locking unit rotating in a first rotational direction in response to said damping material engaging a first portion of said hook-shaped locking unit, said hook-shaped locking unit continuing to rotate in said first rotational direction until said second magnetic plate of said hook-shaped locking unit engages and magnetically attaches to said second locking magnet of said stopper, said locking projection of said hook-shaped locking unit being inserted into said locking groove of said locking arm when said second magnetic plate magnetically attaches to said second locking magnet and impedes movement of said actuator by gripping said locking arm.

17. The self-latching restraint apparatus for an actuator of a disk drive as claimed in claim 16, wherein said hook-shaped locking unit rotates in a second rotational direction opposite to said first rotational direction until said first magnetic plate of said hook-shaped locking unit engages and magnetically attaches to said first locking magnet of said stopper and releases said locking arm to accommodate movement of said actuator.

18. The self-latching restraint apparatus for an actuator of a disk drive as claimed in claim 16, wherein said damping material comprises one of rubber and a plate spring.

19. The self-latching restraint apparatus for an actuator of a disk drive as claimed in claim 16, wherein said first locking magnet of said stopper magnetically attaches to said first magnetic plate of said hook-shaped locking unit when said actuator is in an unlocked state.

20. The self-latching restraint apparatus for an actuator of a disk drive as claimed in claim 16, wherein said second locking magnet of said stopper magnetically attaches to said second magnetic plate of said hook-shaped locking unit when said actuator is in a locked state.

* * * * *